Figure 1:
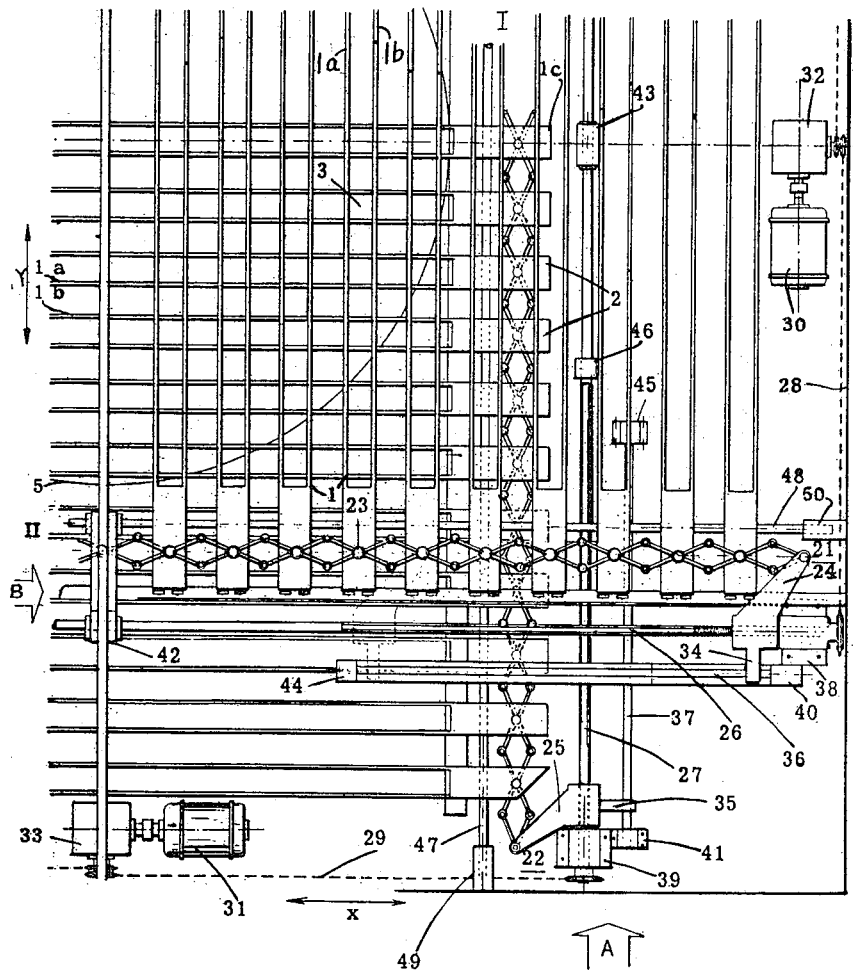

FIG. I 3,188,276
FUEL ELEMENTS ADJUSTING DEVICES IN NUCLEAR REACTOR
Eric Aranovitch, Varese, Pierre Bonnaure, Sesto Calende, and Guido Mollica, Varese, Italy, assignors to Communaute Europeenne de l'Energie Atomique, Brussels, Belgium
Filed Feb. 7, 1963, Ser. No. 260,940
6 Claims. (Cl. 176—28)

This invention relates to devices for adjusting the relative positions of fuel elements within a nuclear reactor.

A prior art device for adjusting the positions of fuel elements comprises a number of supporting and guiding bars which are located in parallel relationship, one to another, in a horizontal plane and which support the fuel elements. The supporting bars are movable transversely to their axes in the horizontal plane by a system of articulated rhombuses and for this purpose the ends of each of the supporting bars are provided with sleeves which are slidably mounted on a pair of transverse supporting beams, and to which the articulated rhombuses are connected at their points of intersection.

The supporting pads of the fuel elements on each supporting bar are similarly attached to a system of articulated rhombuses which permit movement of the fuel elements in a direction transverse to that of the supporting bar by the first system of articulated rhombuses. The arrangement thus permits the adjustment of the fuel elements in two directions at right angles to each other in the horizontal plane.

A disadvantage of the prior art device as described above is the cumbersome nature of the adjusting mechanism. In addition to the two systems of articulated rhombuses required for adjusting the supporting bars, it is also necessary to provide a system of articulated rhombuses for the adjustment of each row of fuel elements on its supporting bar. The necessity of providing all this adjusting mechanism makes it very difficult to synchronise the adjusting movements. Furthermore the weight of the mechanism together with the fuel elements is supported solely on the pair of transverse supporting beams and this causes certain mechanical complications, such as the stability of the assembly. A further disadvantage of this prior device is that the force required to move the fuel elements in the two directions is very unequal.

It is an object therefore, of this invention to provide an improved adjusting device which avoids the abovementioned disadvantages. In particular, the adjusting device of the present invention includes a more simple adjusting mechanism and has a high mechanical stability.

According to the invention there is provided a device for adjusting the relative positions of fuel elements, and where necessary reflecting screens, in a nuclear reactor, characterised by two sets of guide bars symmetrically crossing one another at an angle of 90° in two superposed planes, the bars comprising parallel I-sections having spaces therebetween for carriages which are supported by the bars of one of said sets, said carriages being adapted to support the fuel elements.

The bars of each set are connected at their ends to displacement mechanisms, such as a system of articulated rhombuses, and the two bars which intersect one another on the axis of the lattice of the reactor are fixed in position.

Figure 2:
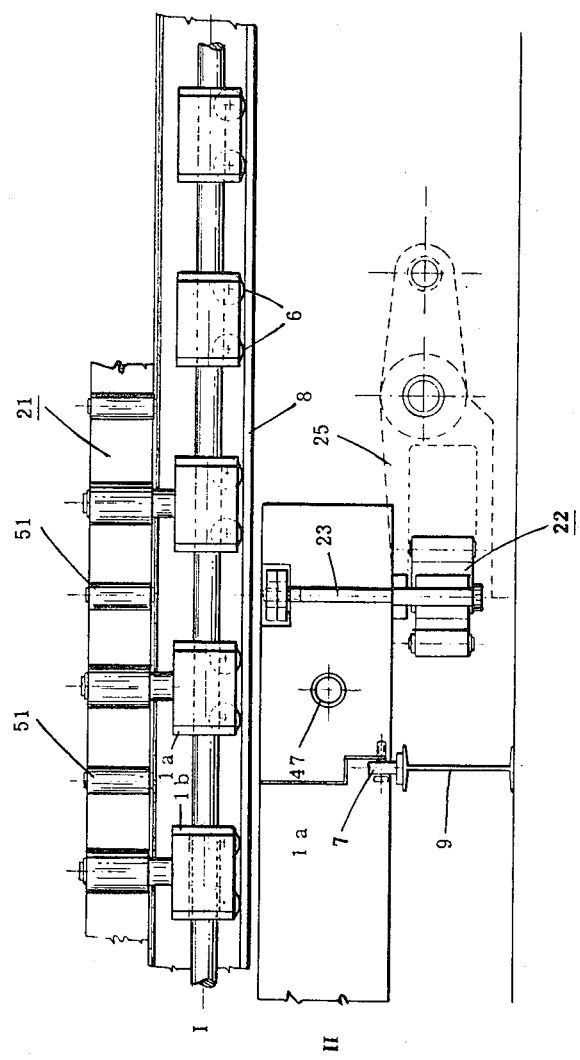
Figure 3:
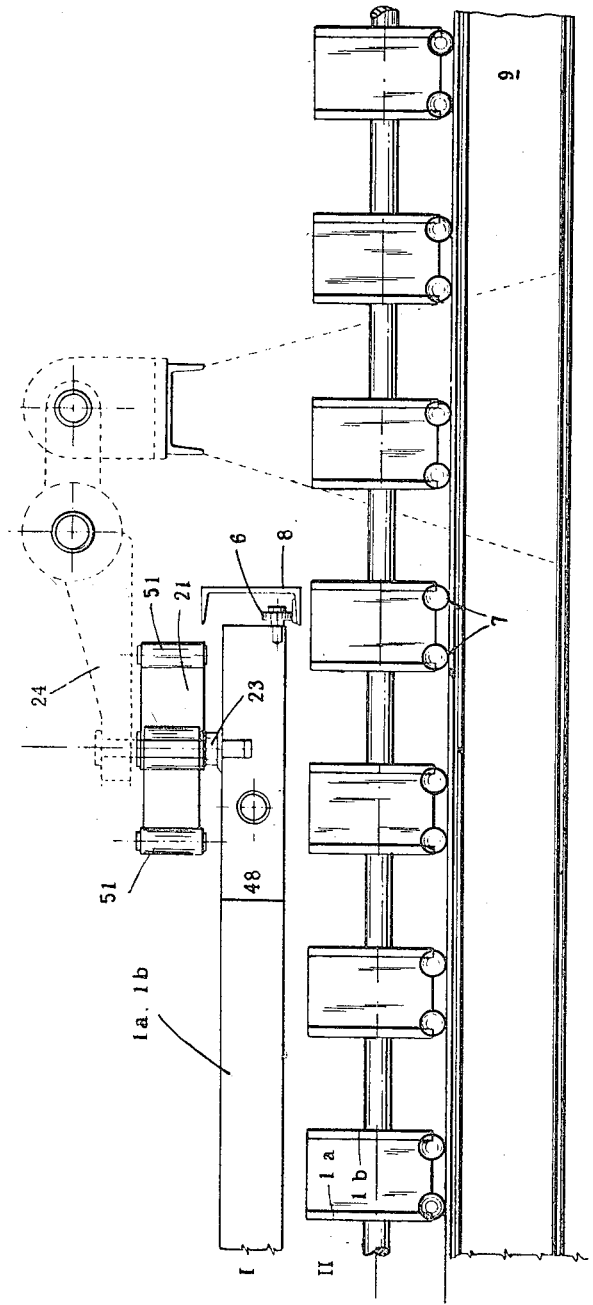
Figure 4:
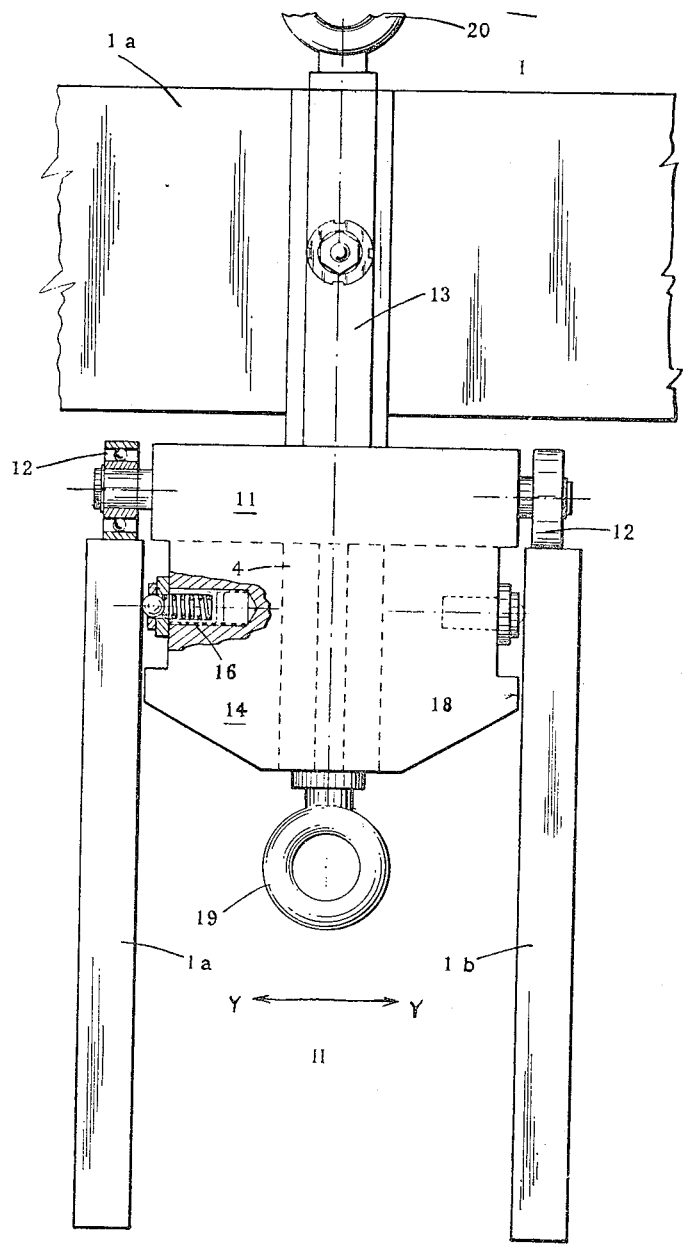
Figure 5:
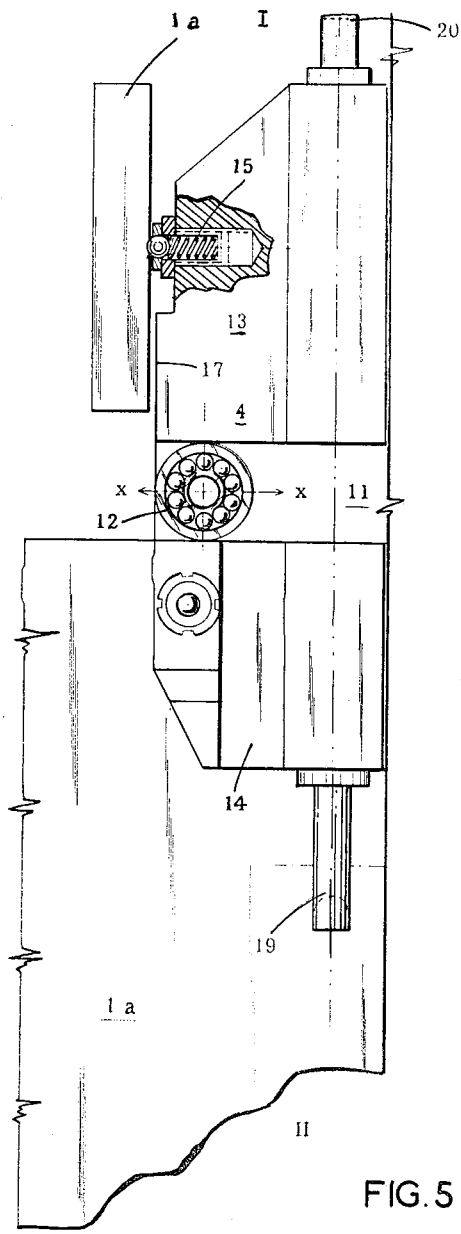

The invention will now be described by way of example with reference to the accompanying drawings in which:

FIG. 1 is a fragmentary plan view of the adjusting device for a lattice sector of 90°, FIGS. 2 and 3 are views showing details of the guide bars and of their driving members, as seen from the points A and B in FIG. 1, and FIGS. 4 and 5 are a front view and a side view, respectively, of a carriage intended to support the fuel elements.

As will be seen from FIGS. 1 to 3, the device for adjusting the lateral spacings between the fuel rods or such elements comprises two sets of guide bars I and II, which cross one another symmetrically at an angle of 90° in two superposed planes. The bars 1, 2 each consist of spaced parallel I-sections $1a$, $1b$ having a space 3 therebetween in which carriages 4 are positioned. The carriages 4 are supported by the bars of the lower set II and are intended to support the fuel rods (see FIGS. 4 and 5). The sets of bars are in the form of rectangles, of which the superposed zone is situated above the reactor area as shown diagrammatically by the circle 5. The guide bars of the non-superposed parts of the sets (five bars in the present embodiment) are intended to support reflecting elements.

The bars of each set are connected at their ends to systems of articulated rhombuses, two of which are shown in the figures. The bars $1c$ which intersect one another on the axis of the lattice at the centre of the two sets are each fixed, while the adjacent bars can be moved towards or away from one another. During these movements, they shift the fuel rods. For this purpose, the bars are constructed as follows:

The ends of the bars resemble the ends of a hollow girder. Extending between these two outermost parts are the I-sections $1a$, $1b$ mentioned above, which are disposed vertically and thereby ensure that the bar construction is substantially free from bending and torsion. The I-sections have between them a free elongated space 3, the width of which corresponds to that of the fuel rods. The bars of each set rest on rollers 6 and 7 (see in particular FIGS. 2 and 3) which move along tracks 8 and 9 and maintain the vertical spacing between the two planes. The tracks 8 and 9, of which only a single rail is shown in FIG. 1 consists of a double-T section in the case of the set of bars I and of an upright V-section in the case of the set of bars II. The supports for the tracks are not shown in the figures. As will clearly be seen from FIGS. 2 and 3, the sections of the lower set of bars are deeper than those of the upper set, since they serve to support and guide the respective fuel rods for their carriages. This is shown more clearly in FIGS. 4 and 5.

In FIGURES 4 and 5, the reference $1a$ and $1b$ denote the I-sections of an upper bar and of a lower bar in the intersecting position. The member 4 represents a carriage which is positioned in the spaces in the bars, and carries a fuel rod 10. The top of the sections of the lower bars serve as tracks for the carriages. Each carriage is composed of a base plate 11 having four ball-bearings 12 as wheels which are in direct contact with the sections and maintain the vertical spacing between the bars. Each carriage has two portions 13 and 14 which extend upwardly and downwardly respectively from the base plate 11 in the spaces 3 between the bar sections. The edges of the members 13, 14 adjacent the I-sections of the bars each have a resilient stud 15, 16 and shoulders 17, 18 respectively. The upper studs and shoulders serve, in contrast to the corresponding lower members, not only to guide the carriages but also to displace the carriages in the direction of the lower bars when the upper bars are appropriately moved as shown by the arrow X in FIG. 5. The bars of the upper set thus operate as members for moving the carriages, while the bars of the lower set are merely supporting members. The displacement of the carriages in the direction of the arrow Y, i.e. upwards and downwards in FIG. 1, is so carried out that the lower bars move with them, the carriages remaining stationary on the tracks on the upper edges of the lower bars. On the other hand, the displacement of the carriages in the direction of the arrow X, i.e. to the left and to the right, takes place in such a manner that the upper bars push the carriages, whereupon the latter roll along the track sections on the top of the lower bars.

As previously mentioned, the fuel rods are supported on the lower part of the carriages by the ring 19. The ring 20 on the upper part serves to engage a crane-hook when carriage-fuel rod units are inserted into the spaces between the bars. FIG. 5 clearly shows all the parts of the carriage, more especially the base plate 11 with the projecting portions 13, 14 which are so shaped and dimensioned that the whole element with the carriage can be lowered into the gaps.

The adjusting mechanism will now be described.

As shown in FIG. 1, the bars 1, 2 of each set of bars have at their ends articulated-rhombus mechanisms, so that there are in all four such mechanisms serving as means for displacing the bars. The systems 21, 22 are shown in the figure. While the bars 1c are fixed in position, all the other bars on the left or the right are movable and are connected to the articulated rhombuses by means of bolts at their crossing points.

The forces necessary for the displacement of the bars are applied by the arms 24, 25 respectively which are situated at the beginning of the articulated-rhombus mechanisms. The arms are internally screwthreaded and are mounted on screwthreaded rods 26, 27 which are connected to driving units through driving chains 28, 29. The driving units consist of electric motors 30, 31 having reduction gears 32, 33. Four screwthreaded rods and four driving units are provided to correspond to the number of articulated-rhombus mechanisms. Each pair of opposed units operates together in synchronism. The outermost position of the arm 24 is indicated by chain lines in the figure.

The arms 24, 25 are provided with auxiliary arms 34, 35, by which they are guided along the rails 36, 37. These rails and the screwthreaded rods are supported at a number of points, i.e. at the points 38 to 46. The bars 1, 2 are also guided, by way of guide rails, of which two, namely the rails 47, 48 with their bearings 49, 50, are shown in FIGURE 1. In FIGURES 2 and 3, the guide rails are shown in section and in side view respectively. The aforesaid figures also show the systems of articulated rhombuses according to FIG. 1; FIG. 3 showing the system of the upper set of bars, and FIG. 2 the systems of the two sets. More especially, FIG. 2 clearly shows the systems of articulated rhombuses positioned above and below the sets of bars. The reference 23 shows the pins of the central bearing of the articulated rhombuses, which are fixed to the bars. The reference 51 denotes the hinge pins of the two consecutive articulated rhombuses. The driving arms 24, 25 are shown by chain lines and, as will be seen, the arm 25 is forked.

The operation of the device is as follows:

When it is desired to move the fuel rods towards or away from one another, the driving units are started either simultaneously or in succession.

When the spacing is to be reduced, the parts of the articulated rhombuses on two sides of the fixed central bar 1c are shifted towards this bar. For this reason, the guide bars also move towards one another. When the spacing is to be increased, the procedure is reversed. It is possible to operate with the same or different speeds of adjustment on the two sets of bars. The sequence of operation of the two sets of bars is of no importance. It is the desired configuration for the lattice which is important in all cases. During the adjusting movements, each carriage is moved in the direction of the arrow Y by the lower set of bars and are pushed in the direction of the arrow X by the upper set of bars, and thus reach their new position.

The uncrossed spaces of the sets of bars, outside the lattice of the reactor, are intended for the reflecting screens. These elements are also displaced in the course of an adjusting operation by movement of the corresponding bars.

What we claim is:

1. In a nuclear reactor having a horizontal regular lattice and having fuel elements located in spaced relationship at the apices of the lattice, a first set of guide bars parallel to a predetermined direction, each of said first guide bars comprising two first parts parallel to said direction, said parts defining first vertical spaces therebetween, a second set of guide bars parallel to a direction transverse to said predetermined direction, each of said second guide bars comprising two second parts parallel to said transverse direction, said two second parts defining second vertical spaces therebetween, first mechanical linkage means interconnecting said first guide bars for simultaneously changing the distance between said first bars while maintaining a constant ratio between said first spaces, second mechanical linkage means interconnecting said second guide bars for simultaneously changing the distance between said second guide bars while maintaining a constant ratio between said second spaces, and a plurality of carriages each receiving one of the fuel elements, each of said carriages being slidably supported by a bar of one of said sets for movement along said bar and each of said carriages projecting into the space of an adjacent bar of the other of said sets for movement along said space.

2. Structure as described in claim 1, said mechanical linkage comprising articulated rhombuses connected to the ends of the bars, the bars crossing one another on the axis of the lattice of the reactor being fixed in position.

3. Structure as described in claim 1, each of said carriages including a base plate, rollers for said base plate rolling on said parallel parts of one of said bars and guide portions extending upwardly and downwardly from said base plate in the spaces between said parallel parts of said two sets of bars, said sets of bars being spaced apart vertically.

4. Structure as described in claim 1 including rollers mounted on the ends of said bars and stationary tracks receiving said rollers.

5. Structure as described in claim 1, said parallel parts having an I-shaped cross section disposed with its longer dimension vertical.

6. Structure as described in claim 5, the sections of the bars of the lower set being higher than the sections of the bars of the upper set.

References Cited by the Examiner
UNITED STATES PATENTS

| | | | |
|---|---|---|---|
| 3,026,258 | 3/62 | Huet | 204—193.2 |
| 3,070,531 | 12/62 | Huet | 204—193.2 |

FOREIGN PATENTS

| | | | |
|---|---|---|---|
| 565,340 | 3/58 | Belgium | 204—193.2 |

REUBEN EPSTEIN, *Acting Primary Examiner.*